(12) United States Patent
Cheng et al.

(10) Patent No.: US 12,464,274 B2
(45) Date of Patent: Nov. 4, 2025

(54) CUSHION FOR WEARABLE DEVICE

(71) Applicant: Merry Electronics(Shenzhen) Co., Ltd., ShenZhen (CN)

(72) Inventors: Ying Chen Cheng, Taichung (TW); Yu Lin Chu, Taichung (TW); Cheng Yu Tsai, Taichung (TW); Hsin-Chu Lin, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 313 days.

(21) Appl. No.: 18/463,283

(22) Filed: Sep. 7, 2023

(65) Prior Publication Data
US 2025/0088782 A1    Mar. 13, 2025

(51) Int. Cl.
*H04R 1/10* (2006.01)

(52) U.S. Cl.
CPC ....... *H04R 1/1008* (2013.01); *H04R 2201/10* (2013.01)

(58) Field of Classification Search
CPC ...... H04R 1/1008; H04R 1/10; H04R 1/1058; H04R 1/1091; H04R 5/033; H04R 5/0335; H04R 2205/022; H04R 2201/10; C09K 5/00; C09K 5/08
USPC ......................................... 381/371, 370, 374
See application file for complete search history.

(56) References Cited

U.S. PATENT DOCUMENTS

| | | | | |
|---|---|---|---|---|
| 6,856,690 | B1* | 2/2005 | Skulley | H04R 1/1008 381/367 |
| 2005/0089185 | A1* | 4/2005 | Allen | H04R 1/1008 381/370 |
| 2013/0087404 | A1* | 4/2013 | Peskar | B32B 27/08 181/129 |
| 2014/0079270 | A1* | 3/2014 | Essabar | H04R 1/1008 381/370 |
| 2015/0197678 | A1* | 7/2015 | Han | C09K 5/063 264/129 |
| 2018/0262827 | A1* | 9/2018 | Vaughan | H04R 1/1041 |
| 2021/0267382 | A1* | 9/2021 | Aou | C09D 171/02 |
| 2021/0363664 | A1* | 11/2021 | Wei | D01F 6/60 |
| 2024/0043729 | A1* | 2/2024 | Wang | C08J 3/075 |

FOREIGN PATENT DOCUMENTS

WO    WO-2022178334 A1 *  8/2022  ........... A61F 7/0053

* cited by examiner

*Primary Examiner* — Ahmad F. Matar
*Assistant Examiner* — Sabrina Diaz
(74) *Attorney, Agent, or Firm* — JCIPRNET

(57) ABSTRACT

A cushion for a wearable device includes an outer cover layer and an inner cushion. The outer cover layer includes a first base material, a heat conducting material and a first heat storage material. The heat conducting material and the first heat storage material are dispersed in the first base material. The enthalpy value of the outer cover layer is less than or equal to 5 J/g. The inner cushion includes a second base material and a second heat storage material. The second heat storage material is dispersed in the second base material. The enthalpy value of the inner cushion is greater than that of the outer cover layer. The difference between the enthalpy value of the inner cushion and the enthalpy value of the outer cover layer is greater than 45 J/g.

15 Claims, 5 Drawing Sheets

CUSHION FOR WEARABLE DEVICE

BACKGROUND

Technical Field

The present invention is related to a cushion for a wearable device, and especially related to a cushion that can be worn comfortably for a long time.

Description of Related Art

With the continuous advancement of technology, the designs and styles of wearable devices, such as headphones and watches, are becoming increasingly diverse. These wearable devices not only offer more functional possibilities but also provide users with a wider range of choices in terms of appearance and style. However, this diversity presents a common challenge: maintaining comfort while using these wearable devices.

In general, when a user wears a wearable device, the heat emitted by the human body tends to accumulate inside the device, leading to an increase in its temperature. This can potentially affect the user's comfort, especially during extended periods of wear.

To address this issue, numerous manufacturers are dedicated to researching and developing solutions aimed at enhancing the thermal performance of wearable devices.

SUMMARY

The present invention provides a cushion for a wearable device that, through the coordination of the enthalpy of the outer cover layer and the enthalpy of the inner cushion, helps dissipate the accumulated heat from the cushion in the direction away from the user's skin.

At least one embodiment of the present invention provides a cushion for a wearable device, comprising an outer cover layer and an inner cushion. The outer cover layer includes a first base material, a heat conducting material, and a first heat storage material. The heat conducting material and the first heat storage material are dispersed within the first base material. The enthalpy of the outer cover layer is less than or equal to 5 J/g. The inner cushion includes a second base material and a second heat storage material, with the second heat storage material dispersed within the second base material. The enthalpy of the inner cushion is greater than that of the outer cover layer. The difference between the enthalpy of the inner cushion and that of the outer cover layer exceeds 45 J/g.

Based on the above, the difference between the enthalpy of the inner cushion and that of the outer cover layer exceeds 45 J/g. This improvement enhances the overall heat storage capacity of the cushion and ensures that heat within the cushion continues to be dissipated away from the user's skin. Consequently, it enhances the comfort of the user during extended periods of wearing the wearable device.

DESCRIPTION OF THE EMBODIMENTS

Figure 1:
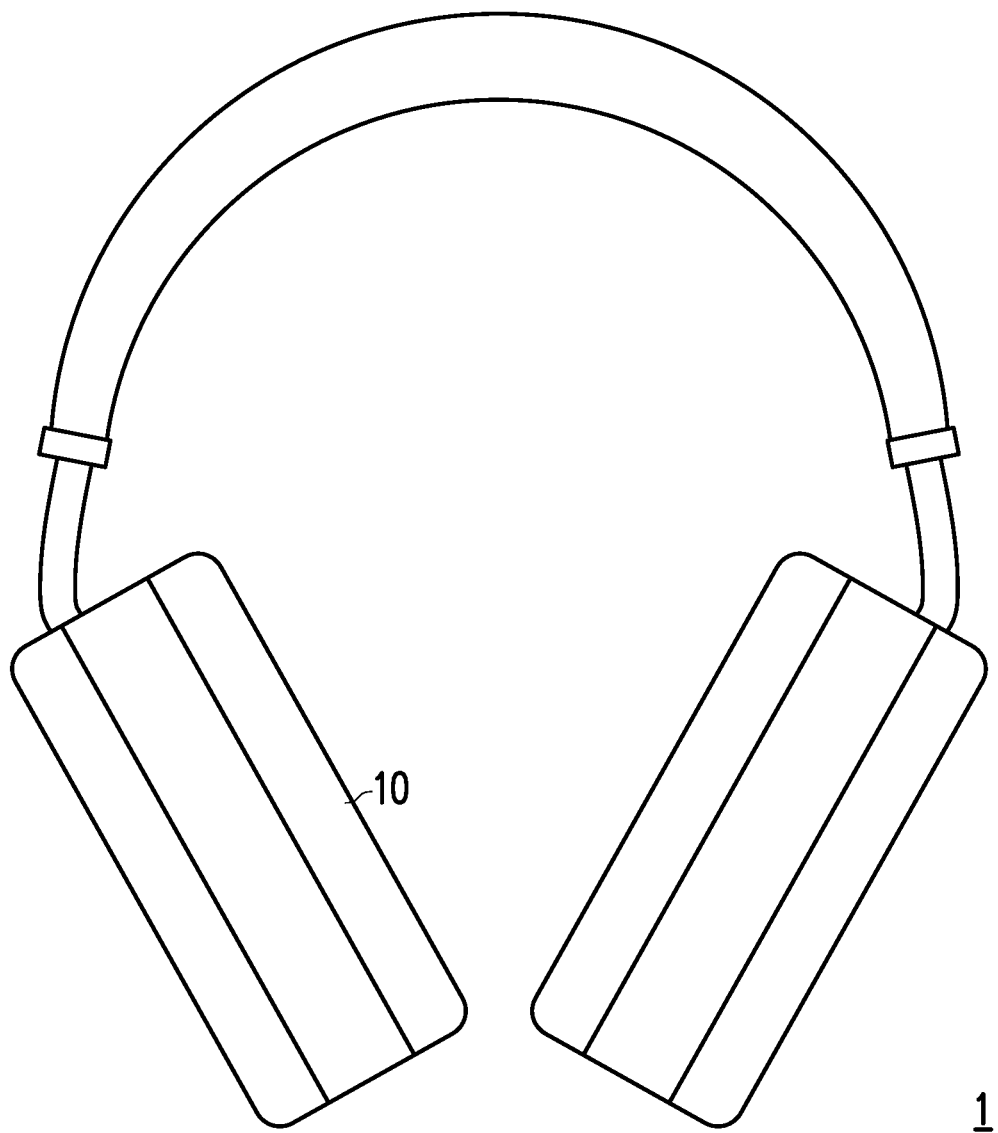
FIG. 1 is a schematic front view of a wearable device according to an embodiment of the present invention.

FIG. 1 is a schematic front view of a wearable device 1 according to an embodiment of the present invention. Referring to FIG. 1, in this embodiment, the wearable device 1 is headphones, and the wearable device 1 includes a cushion 10 configured to make contact around the user's ear. It should be noted that although the cushion 10 is used as the cushion for the headphones in FIG. 1, the present invention is not limited thereto. In other embodiments, the cushion 10 can be installed in other types of wearable devices, and placed in contact with the user. In some embodiments, the wearable device is, for example, a smart watch, smart glasses, a virtual reality device, a smart ring, or the like.

Figure 2:
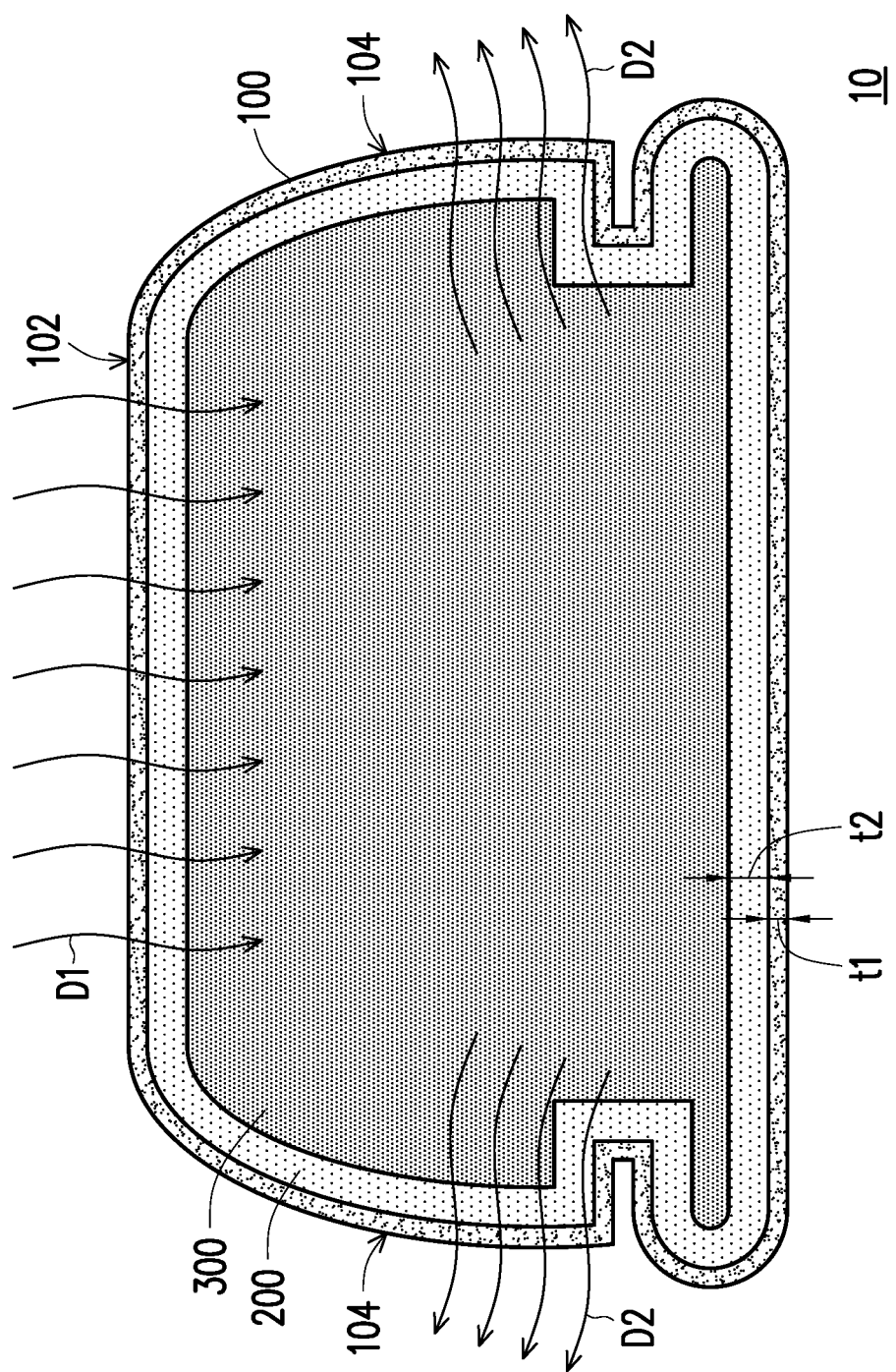
FIG. 2 is a schematic cross-sectional view of a cushion for a wearable device according to an embodiment of the present invention.

FIG. 2 is a schematic cross-sectional view of the cushion 10 for the wearable device according to an embodiment of the present invention. For example, the cushion 10 of FIG. 2 is applied to the wearable device 1 of FIG. 1. Referring to FIG. 2, the cushion 10 includes an outer cover layer 100 and an inner cushion 300. In some embodiments, the cushion 10 further includes a heat radiation layer 200.

The outer cover layer 100 includes a first base material (not individually shown), a heat conducting material (not individually shown) and a first heat storage material (not individually shown). The heat conducting material and the first heat storage material are dispersed within the first base material. In some embodiments, the outer cover layer 100 is artificial leather, wherein the first base material includes polymer material. For example, the first base material includes polyurethane (PU), polyvinyl chloride (PVC), polyester (PE), Oxford fabric or other suitable material or a combination of the aforementioned materials. In some embodiments, the heat conducting material includes graphene, aluminum oxide, silicon dioxide, polyols, cryogel or other suitable material or combination of the aforementioned materials. In some embodiments, the first heat storage material includes a phase change material (PCM), such as paraffin, fatty acid, salt hydrate or other suitable material or a combination of the aforementioned materials.

In some embodiments, the thermal conductivity of the heat conducting material in the outer cover layer 100 is greater than the thermal conductivity of the first heat storage material in the outer cover layer 100. In some embodiments, the enthalpy of the first heat storage material in the outer cover layer 100 is greater than the enthalpy of the heat conducting material in the outer cover layer 100.

In some embodiments, the total weight percentage of the heat conducting material and the first heat storage material in the outer cover layer 100 ranges from 30 wt % to 40 wt %. In some embodiments, with the total weight of the heat conducting material and the first heat storage material considered as one hundred percent by weight, the heat conducting material occupies 10 to 20 percent by weight, while the first heat storage material occupies 80 to 90 percent by weight.

In some embodiments, the addition of the heat conducting material and the first heat storage material to the outer cover layer 100 results in the enthalpy of the outer cover layer 100 being less than or equal to 5 J/g. For example, the enthalpy value of the outer cover layer 100 may range from 1.3 J/g to 5 J/g.

In this embodiment, the addition of the heat conducting material to the outer cover layer 100 facilitates the transfer of heat energy in a parallel direction (i.e., horizontal direction) along the outer cover layer 100. On the other hand, the addition of the first heat storage material to the outer cover layer 100 helps in conducting heat in a vertical direction perpendicular to a surface of the outer cover layer 100 to the inner cushion 300. To ensure the performance of the wearable device, it is necessary to control the enthalpy of the outer cover layer 100 to be within 5 J/g. This is because adding an excessive amount of the first heat storage material (e.g., PCM) may stiffen the structure of the outer cover layer 100, potentially leading to cracking or brittleness of the outer cover layer 100 during the high temperature processes.

In some embodiments, the thickness t1 of the outer cover layer 100 ranges from 0.1 millimeters to 0.3 millimeters.

The outer cover layer 100 is disposed on the outside of the inner cushion 300. For example, the outer cover layer 100 surrounds the inner cushion 300, and the inner cushion 300 is contained within the outer cover layer 100. In some embodiments, the outer cover layer 100 fully encloses or partially encloses the inner cushion 300.

The inner cushion 300 includes a second base material (not individually shown) and a second heat storage material (not individually shown). The second heat storage material is dispersed within the second base material. In some embodiments, the second base material is a porous elastic structure. For example, materials for the second base material may include memory foam, polyurethane elastomer, natural sponges, polyethylene foam elastomer, ethylene-vinyl acetate (EVA) elastomer, silicone elastomer, polypropylene elastomer, or other suitable materials or combinations thereof. In some embodiments, the second heat storage material includes a phase change material (PCM), such as paraffin, fatty acids, salt hydrates, or other suitable materials or combinations thereof. The second heat storage material in the inner cushion 300 may be the same as or different from the first heat storage material in the outer cover layer 100.

In some embodiments, the weight percentage of the second heat storage material occupying the inner cushion 300 ranges from 20 wt % to 40 wt %.

In some embodiments, the addition of the second heat storage material to the inner cushion 300 results in a higher enthalpy of the inner cushion 300 compared to the enthalpy of the outer cover layer 100. In some embodiments, the difference in between the enthalpy of the inner cushion 300 and the enthalpy of the outer cover layer 100 is greater than 45 J/g. In some embodiments, the enthalpy of the inner cushion 300 is greater than or equal to 50 J/g, preferably greater than or equal to 80 J/g. For example, the enthalpy of the inner cushion 300 may range from 50 J/g to 200 J/g, 70 J/g to 180 J/g, 80 J/g to 160 J/g, 90 J/g to 150 J/g, or other suitable ranges.

In some embodiments, the thermal conductivity of the outer cover layer 100 is greater than that of the inner cushion 300, allowing heat to conduct more efficiently in a horizontal direction along the outer cover layer 100. In some embodiments, the thermal effusivity of the inner cushion 300 is greater than that of the outer cover layer 100, giving the inner cushion 300 improved heat storage and thermal regulation capabilities.

The heat radiation layer 200 is located between the inner cushion 300 and the outer cover layer 100. In some embodiments, the heat radiation layer 200 includes breathable or porous materials. For example, the heat radiation layer 200 includes knitted fabric or other suitable materials.

The thickness t2 of the heat radiation layer 200 ranges from 0.1 millimeters to 0.3 millimeters. In some embodiments, the heat radiation layer 200 is adhered to the outer cover layer 100 through an adhesive layer (not individually shown), and the heat radiation layer 200 is positioned against the inner cushion 300. In other words, the heat radiation layer 200 may not be directly adhered to the inner cushion 300. In other embodiments, the heat radiation layer 200 is adhered to the inner cushion 300 through an additional adhesive layer.

In this embodiment, the outer cover layer 100 includes a heat-absorbing surface 102 and a heat-dissipating surface 104. Specifically, when a user wears the wearable device, the heat-dissipating surface 104 of the outer cover layer 100 is exposed to the surrounding air, and the heat-absorbing surface 102 of the outer cover layer 100 comes into contact with the user's skin. For example, as shown in FIG. 2, heat enters the cushion 10 from the heat-absorbing surface 102 in the heat absorption direction D1, then it is conducted to the heat-dissipating surface 104 and exits the cushion 10 in the heat dissipation direction D2. In this embodiment, the design of the enthalpy of the outer cover layer 100 and the enthalpy of the inner cushion 300 helps create a temperature difference between the outer cover layer 100 and the inner cushion 300, promoting the transfer of heat within the heat radiation layer 200. Additionally, due to the property of heat transfer from high temperature to low temperature, heat within the cushion 10 can be driven toward the heat-dissipating surface 104 exposed to the surrounding air and exit the cushion 10 from the heat-dissipating surface 104.

Figure 3:
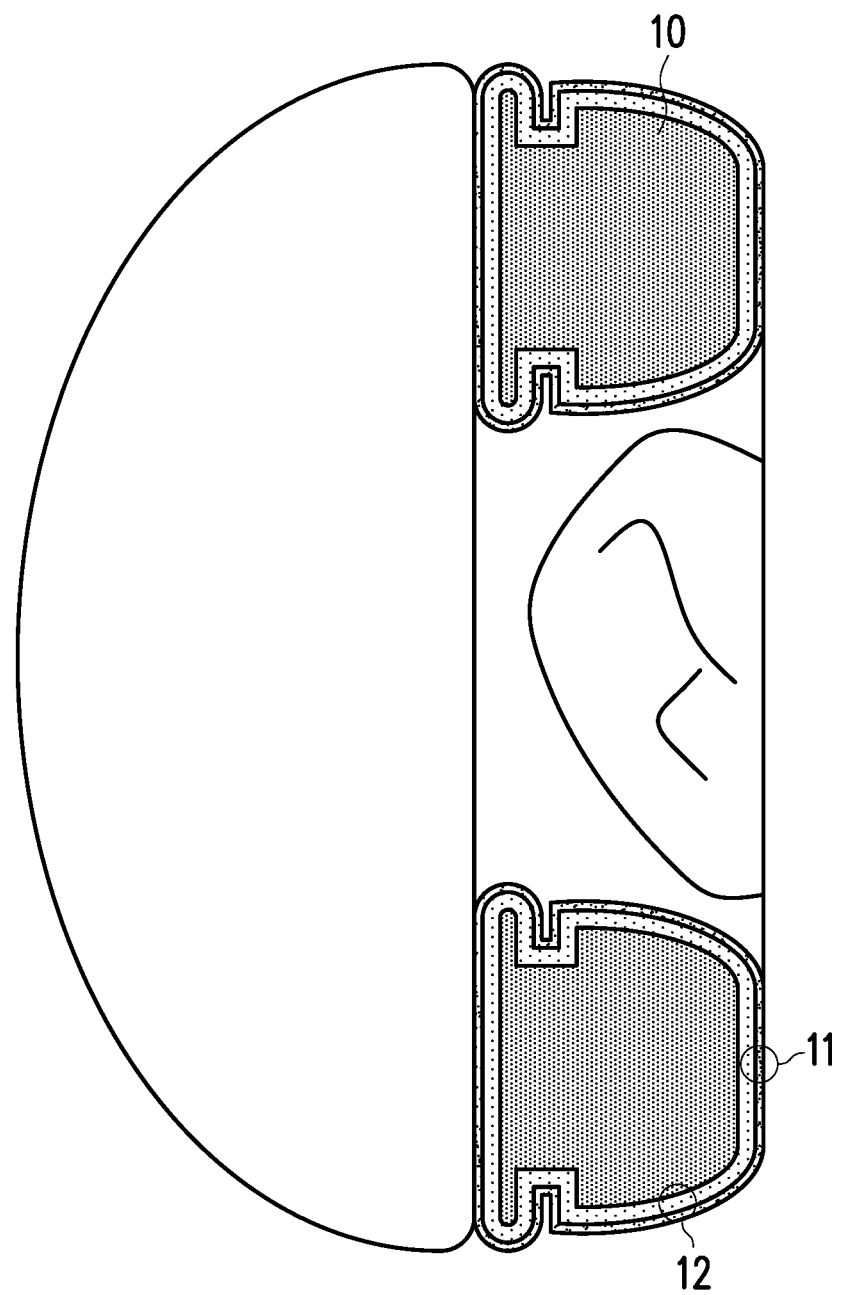
FIG. 3 is a schematic diagram of a wearable device worn on a user according to an embodiment of the present invention.

FIG. 3 is a schematic diagram of a wearable device worn on a user according to an embodiment of the present invention. Referring to FIG. 3, in this embodiment, the wearable device is, for example, headphones, and the cushion 10 of the wearable device is configured to make contact around the user's ears.

Figure 4A:
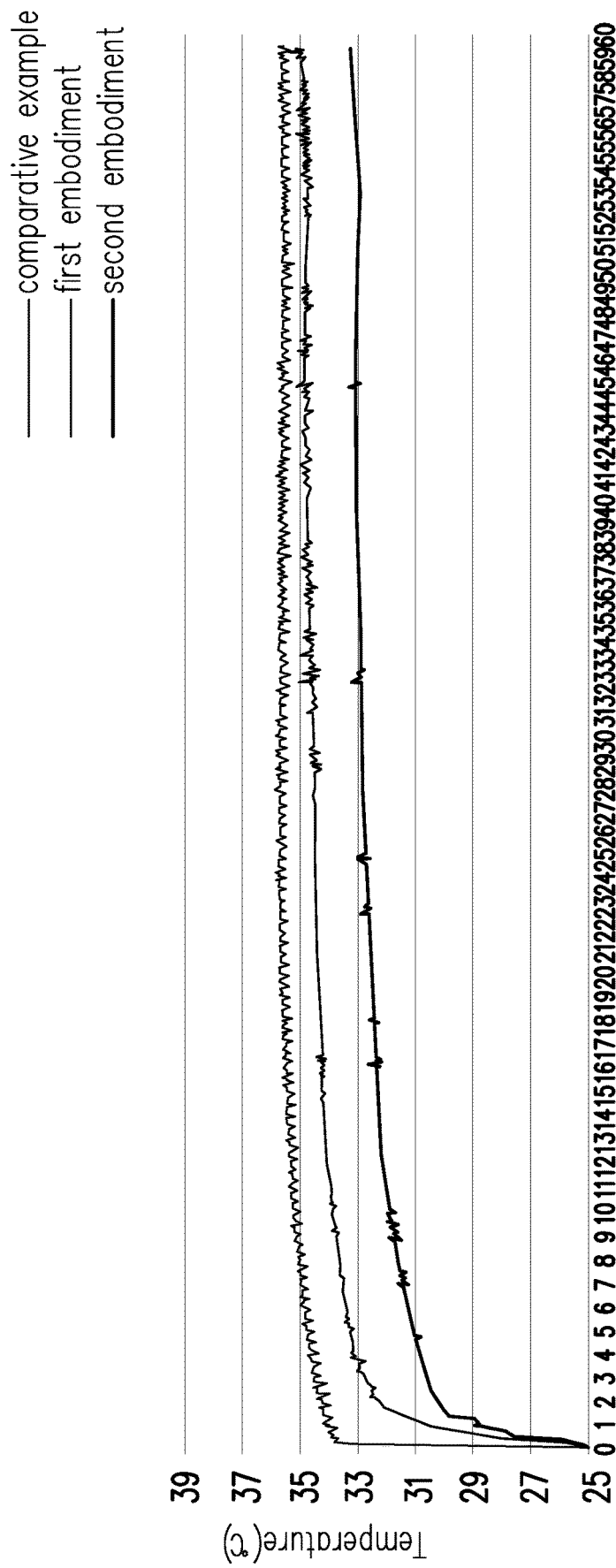
FIG. 4A shows a temperature variation curve at a first test location of cushions for wearable devices according to a comparative example, a first embodiment, and a second embodiment of the present invention.
Figure 4B:
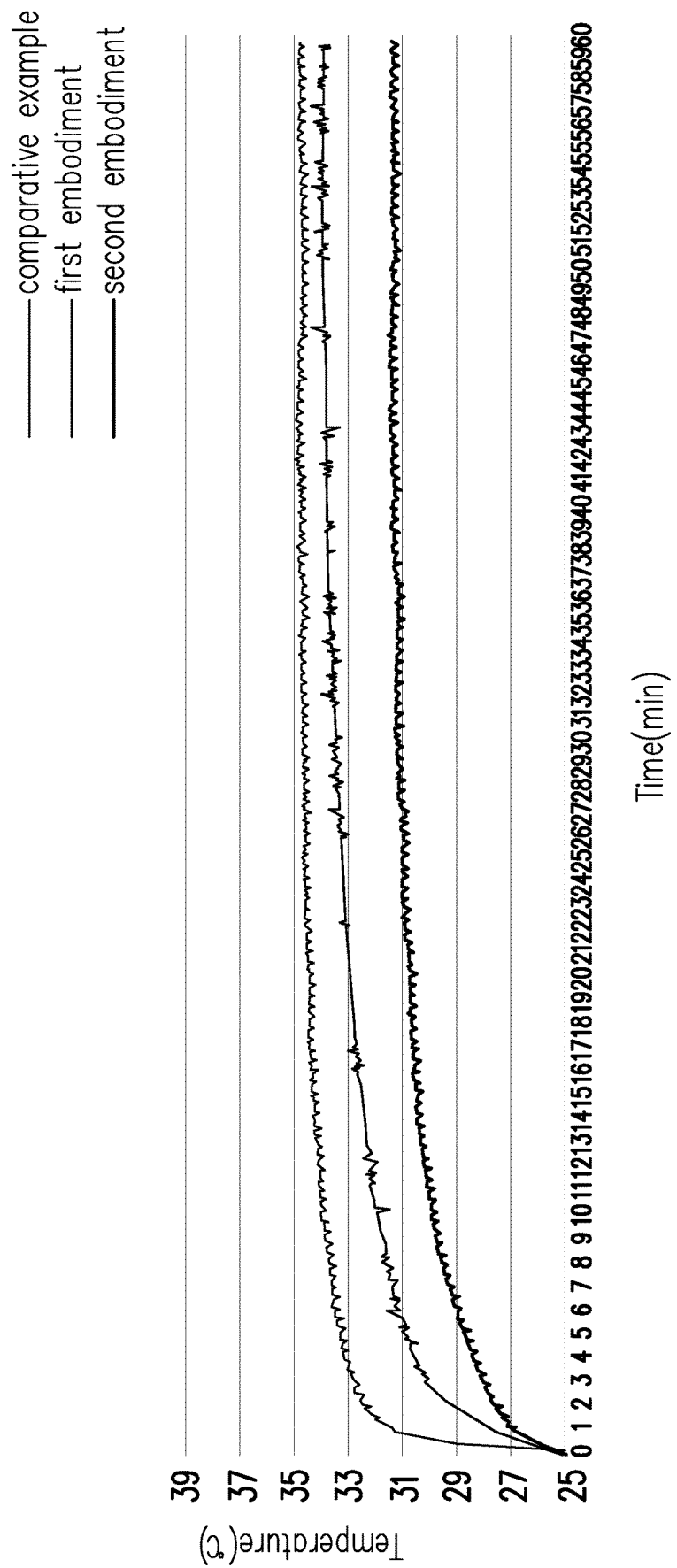
FIG. 4B shows a temperature variation curve at a second test location of the cushions for the wearable devices according to the comparative example, the first embodiment, and the second embodiment of the present invention.

FIG. 4A shows a temperature variation curve at a first test location of cushions for wearable devices according to a comparative example, a first embodiment, and a second embodiment of the present invention. FIG. 4B shows a temperature variation curve at a second test location of the cushions for the wearable devices according to the comparative example, the first embodiment, and the second embodiment of the present invention. For example, the temperature variations were measured at the first test location 11 and the second test location 12 on the cushion 10 shown in FIG. 3, and the results are shown in FIG. 4A and FIG. 4B, respectively. The first test location 11 is located at the point of contact between the outer cover layer and the user's skin, while the second test location 12 is located at the thermal radiation layer.

In FIGS. 4A and 4B, the cushions of the comparative example, the first embodiment, and the second embodiment all include an outer cover layer, a thermal radiation layer, and an inner cushion.

In the comparative example, the outer cover layer does not contain heat conduction material and the first heat storage material (only the first base material is included).

In the first embodiment and the second embodiment, the outer cover layer contains heat conduction material and the first heat storage material dispersed in the first base material, and the enthalpy of the outer cover layer is controlled to be less than or equal to 5 J/g. In both of the first embodiment and the second embodiment, the difference between the enthalpy of the inner cushion and the enthalpy of the outer cover layer is greater than 45 J/g. Specifically, in the first embodiment, the enthalpy of the inner cushion is 50 J/g, while in the second embodiment, the enthalpy of the inner cushion is 80 J/g.

From FIGS. 4A and 4B, it can be noted that, at the beginning of wearing, compared with the cushion of the comparative example, regardless of the surface temperature (the temperature at the first test location, as shown in FIG. 4A) or the internal temperature (the temperature at the second test location, as shown in FIG. 4B) the cushion of the first embodiment and the second embodiment can be raised slowly. In addition, after wearing for a long time, compared with the cushion of the comparative example, regardless of the surface temperature (the temperature at the first test location, as shown in FIG. 4A) or the internal temperature (the temperature at the second test location, as shown in FIG. 4B) the cushion of the first embodiment and the second embodiment can be maintained within a lower temperature and can be continuously and stably controlled within the comfortable range of the human body.

From FIGS. 4A and 4B, it is evident that, during initial wear, both the cushion in the first embodiment and the cushion in the second embodiment exhibit a slower increase in temperature compared to the cushion in the comparative example. This applies to both surface temperature (the temperature at the first test location, as shown in FIG. 4A) and internal temperature (the temperature at the second test location, as shown in FIG. 4B). Furthermore, after prolonged use, both surface temperature (the temperature at the first test location, as shown in FIG. 4A) and internal temperature (the temperature at the second test location, as shown in FIG. 4B) of the cushion of the first and the cushion of the second embodiment, when compared to the cushion in the comparative example, maintain lower temperatures. They can also be consistently and effectively controlled within the comfortable temperature range of the human body.

In summary, in the cushion for the wearable device of the present invention, the difference in between the enthalpy of the inner cushion and the enthalpy of the outer cover layer is greater than 45 J/g, which helps enhance the overall heat storage capacity of the cushion and allows the heat within the cushion to continuously dissipate in the direction away from the user's skin, thereby improving the user's comfort when wearing the wearable device for an extended period.

What is claimed is:

1. A cushion for a wearable device, comprising:
    an outer cover layer, comprising:
        a first base material; and
        a heat conducting material and a first heat storage material, dispersed within the first base material, and enthalpy of the outer cover layer is less than or equal to 5 Joules/gram; and
    an inner cushion, comprising:
        a second base material; and
        a second heat storage material, dispersed within the second base material, wherein enthalpy of the inner cushion is greater than the enthalpy of the outer cover layer, and difference between the enthalpy of the inner cushion and the enthalpy of the outer cover layer is greater than 45 Joules/gram.

2. The cushion for the wearable device of claim 1, wherein the heat conducting material comprises at least one of the following materials: graphene, aluminum oxide, silicon dioxide, polyols and cryogel.

3. The cushion for the wearable device of claim 1, wherein the first heat storage material and the second heat storage material comprise phase change materials.

4. The cushion for the wearable device of claim 1, wherein total weight percentage of the heat conducting material and the first heat storage material in the outer cover layer ranges from 30 wt % to 40 wt %.

5. The cushion for the wearable device of claim 1, wherein with total weight of the heat conducting material and the first heat storage material considered as one hundred percent by weight, the heat conducting material occupies 10 to 20 percent by weight, while the first heat storage material occupies 80 to 90 percent by weight.

6. The cushion for the wearable device of claim 1, wherein weight percentage of the second heat storage material in the inner cushion is 20 wt % to 40 wt %.

7. The cushion for wearable device of claim 1, further comprising:
    a heat radiation layer, located between the inner cushion and the outer cover layer, and thickness of the heat radiation layer is 0.1 millimeter to 0.3 millimeter.

8. The cushion for the wearable device of claim 7, wherein the heat radiation layer adheres to the outer cover layer through an adhesive layer, and the heat radiation layer is positioned against the inner cushion.

9. The cushion for the wearable device of claim 1, wherein thickness of the outer cover layer is 0.1 millimeter to 0.3 millimeter.

10. The cushion for the wearable device of claim 1, wherein thermal conductivity of the outer cover layer is greater than thermal conductivity of the inner cushion.

11. The cushion for the wearable device of claim 1, wherein thermal effusivity of the inner cushion is greater than a thermal effusivity of the outer cover layer.

12. The cushion for the wearable device of claim 11, wherein the inner cushion is accommodated in the outer cover layer.

13. The cushion for the wearable device of claim 1, wherein the second base material has a structure of a porous elastomer, and the second heat storage material is dispersed within the porous elastomer.

14. The cushion for the wearable device of claim 1, wherein the outer cover layer comprises a heat-absorbing surface and a heat-dissipating surface, wherein when a user wears the wearable device, the heat-dissipating surface is exposed to air outside, and the heat-absorbing surface is in contact with a skin of the user.

15. The cushion for the wearable device of claim 1, wherein the enthalpy of the outer cover layer is 1.3~5 Joules/gram, and the enthalpy of the inner cushion is greater than 80 Joules/gram.

* * * * *